Patented Feb. 10, 1925.

1,525,564

UNITED STATES PATENT OFFICE.

THOMAS J. BARRETT, OF BORDENTOWN, NEW JERSEY.

PROCESS FOR MAKING BITUMINOUS PAVING MIXTURES.

No Drawing.   Application filed December 13, 1921.   Serial No. 522,107.

*To all whom it may concern:*

Be it known that I, THOMAS J. BARRETT, a citizen of the United States, residing in Bordentown, in the county of Burlington and State of New Jersey, have invented certain new and useful Improvements in Processes for Making Bituminous Paving Mixtures, whereof the following is a specification.

My invention relates to a process of manufacturing a bituminous paving mixture for surfacing or repairing roads, streets and the like, according to which the requisite heating of the aggregate and of the bituminous binder, in order to properly unite them, may be readily accomplished, with less machinery than is usually employed for this purpose.

According to my invention, I am able to quickly and economically heat and mix together a mineral aggregate and the required binder. This I accomplish by combining with a bituminous paving cement a sufficient amount of an inflammable solvent to permit the ignition of the same in the mixer, so that during the process of mixing the binder with the aggregate, the combustion of this solvent sufficiently heats the ingredients of the mixture. I thus avoid the necessity of preheating either the aggregate or the mixture at a paving plant, and accomplish with a minimum of machinery and labor, and preferably near the place of making or repairing the road, the production of a hot mixture suitable for the purposes named.

Notwithstanding the use for road building purposes of so-called cold mixtures in which the binder is usually either fluxed with a volatile solvent, or is in the state of an emulsion, it is fully recognized that for the most satisfactory cohesion between aggregate and binder, heat is necessary. A cold or wet aggregate will not so well adhere to a bituminous binder as if it is heated, and, for this purpose, there has ordinarily been required a rather elaborate paving plant either stationary or portable. But, by my invention, the contents of a mechanical mixer are internally heated without the necessity of the application of external heat, thereby insuring the production of a most satisfactory hot paving mixture with the least expenditure for labor or machinery.

In my previous Patent, No. 1,051,478, dated January 28, 1913, I have described my earlier method of producing a hot paving mixture by adding to the bitumen an inflammable solvent, combining it with a coarse aggregate spread upon the roadway, and igniting the solvent upon the roadway, thereby heating both aggregate and bitumen and producing a more adherent combination than would otherwise be obtained. But this process can only be used with a coarse aggregate, and it is sometimes difficult to bring about the uniform ignition and burning of the mixture when in place upon the road.

My present invention differs from that which is described in my previous patent, in that the heating of the mixture is accomplished in the course of the mixing operation, whereby the aggregate and bitumen are more thoroughly combined.

In carrying out my invention I employ as the binder a fluxed bitumen, as for example one of the usual asphaltic cements prepared for paving purposes. This will preferably be an asphaltic cement of the penetration required for the work at hand.

With this binder there is homogeneously incorporated a volatile solvent that is inflammable, such as gasolene, naphtha, benzine, benzene, kerosene or a mixture of these; thereby producing a liquid asphaltic cement.

I place a given quantity of the aggregate which is to be employed in a suitable mixing receptacle, as for example a well known type of concrete mixer, and to the aggregate I add this liquid asphaltic cement, which has previously been prepared by melting the asphalt, fluxing it, and adding to the liquid mass a sufficient quantity of the inflammable solvent, and thoroughly stirring it in until the mixture is homogeneous. This may preferably be done at the paving plant.

The amount of this solvent to be added will vary from 10 to 50% of the entire mass of the binder dependent upon the nature of the solvent, and whether the operation is carried on in winter or summer, and also upon the penetration desired for the completed binder. For ordinary purposes, from 18 to 25% of the inflammable solvent will produce the desired bituminous binder.

According to the process of my previous patent, to which I have referred, I was compelled to use an open coarse aggregate, as the process there described will not permit of the incorporation of the binding material with a graded or fine aggregate. But, according to my present invention, I am able to employ an aggregate of any kind, including a graded stone and sand mixture, or the well known surface street asphalt mixture employed for city streets.

My invention differs from the process described in United States Letters Patent No. 760,051 to J. H. Amies in that I introduce the asphalt into the mixer in a fluxed or fluid condition, instead of in a solid condition, so that the heat of ignition is not required to liquify the binder.

In practicing my invention, I employ a mixer which may be brought in proximity to the work being performed. I place in the mixer the aggregate, and add thereto the binder, consisting of fluxed bitumen and the inflammable solvent, and of the desired fluidity. The proportions of the binder will vary according to the nature of the aggregate and will amount to say from 6 to 18% of the mixture by weight. Having added this binder to the aggregate, after making a few turns of the mixer, the inflammable solvent is ignited as by throwing in a burning match. This is followed by a slight explosion, after which the solvent continues to burn. The revolution of the mixer and the coating of the surfaces of the aggregate effect a continuous and rapid vaporization of the solvent, and an intermixture of the inflammable vapor with the oxygen of the air, so that ignition is easily effected. The burning continues for a minute or two, thoroughly heating the entire aggregate to the desired temperature, so that it is dried and properly incorporated with the binder. When the flame goes out, mixing may be continued long enough to produce the required uniform mass, and then the hot mixture is ready to be placed on the road. By the burning of the solvent, there has been produced a hot bituminous mixture sufficiently fluid for placing and laying, but which when cold will have the desired stability and hardness for use in the street or road.

If any of the volatile solvent remains in the binder, it is eventually volatilized and disappears. It is an advantage of my present invention that although the solvent is of itself highly combustible, yet the mixture of bitumen with this solvent need not be such as to ignite upon the mere application of the flame of a match. It is better to employ such a material that only the rapid stirring and coating of the material in the mixer renders it sufficiently inflammable to explode or burn. This is desirable, because it is obviously safer, when the binding material is being transported, that it be not too combustible.

I find it convenient to prepare and ship to the place of use, the binding material consisting of bitumen and the inflammable solvent in barrels, where they may be used as needed. Likewise, the aggregate is transported to the place of use without preheating. Accordingly, the only machinery required to carry out the work comprises the mixer and the required tools for laying such a mixture.

As mentioned above, my present process owes its success with aggregates of or including fine particles (as compared with the impracticability of the process described in my prior Patent No. 1,051,478, for any but coarse aggregates) to the agitation of the fluid binder and the aggregate together, which assures a sufficiently rapid evolution of vapor of the solvent to maintain vigorous combustion and to heat the whole mass to a suitable temperature. The confinement of the vapors in the mixer is also favorable, both in assuring a combustible mixture of air and vapor and in conserving the heat from the combustion. And as compared with the failure of a proposed process wherein the aggregate, after "dampening" with fluxoil and naphtha, was to be mixed with powdered bitumen and then ignited, the success of my present process is attributable to the fact that I employ the bitumen already fluxed or in a fluid state, and only require the heat from the burning solvent to heat the aggregate and to keep the binder freely fluid as the solvent burns away.

In its preferred form, therefore, my present process is distinguished by the fluxed or fluid character of the binder at starting, by the agitation of the aggregate and binder during ignition and combustion, and by the confinement of the vapors of the solvent in the usual type of concrete mixer, as well as by the adaptation of the process to either coarse or fine aggregates.

Having thus described my invention, I claim:

1. The process of making a paving mixture which consists in adding to a cold aggregate a liquid bituminous binder which includes an inflammable solvent, mixing the two together under confinement but with access of air, and igniting the solvent during the mixing operation, whereby the aggregate is simultaneously heated and coated with the binder.

2. The process of producing a bituminous paving mixture which consists in placing in a mixer an aggregate, an inflammable solvent, and a suitably fluxed bituminous paving cement, and then igniting and burning the inflammable solvent during the process of mixing the ingredients, whereby sufficient heat is imparted to the aggregate to cause it to properly mix with the paving cement to form a paving mixture.

3. The process of making a paving mixture which consists in violently mixing and stirring together, in confinement but with access of air, a suitable mineral aggregate and a liquid binder formed of a bituminous material combined with an inflammable solvent, and igniting the confined vapor of the solvent thus evolved and permitting it to burn during the stirring and mixing operation.

4. The process of road building or repair which consists in placing a desired mineral aggregate in a mechanical mixer, adding thereto a liquid bituminous binder containing an inflammable solvent, thoroughly incorporating the two in the mixer, igniting and burning the solvent in the course of the mixing operation, whereby a hot paving mixture is produced, and placing this mixture upon the roadway.

5. The process of making a water-proof surface paving mixture, which consists in placing in a rotary mixer a graded aggregate including fine particles and a liquid binder consisting of bituminous material combined with an inflammable solvent, mixing the two by rotation of the mixer, and igniting and burning the inflammable solvent within the mixer and as a part of the mixing operation.

In testimony whereof, I have hereunto signed my name at Philadelphia, Pennsylvania, this 12th day of December, 1921.

THOMAS J. BARRETT.

Witnesses:
JAMES H. BELL,
E. L. FULLERTON.